(12) United States Patent
Piersol

(10) Patent No.: US 9,026,474 B2
(45) Date of Patent: May 5, 2015

(54) GENERATING PRINTABLE CERTIFICATES TO VERIFY LOG AUTHENTICITY

(75) Inventor: Kurt W. Piersol, Campbell, CA (US)

(73) Assignee: Google Inc., Mountain View, CA (US)

( * ) Notice: Subject to any disclaimer, the term of this patent is extended or adjusted under 35 U.S.C. 154(b) by 460 days.

(21) Appl. No.: 13/042,298

(22) Filed: Mar. 7, 2011

(65) Prior Publication Data

US 2012/0233029 A1  Sep. 13, 2012

(51) Int. Cl.
| | |
|---|---|
| *G06Q 10/10* | (2012.01) |
| *G06K 9/00* | (2006.01) |
| *G06Q 30/00* | (2012.01) |
| *G06K 15/02* | (2006.01) |
| *G06Q 20/38* | (2012.01) |

(52) U.S. Cl.
CPC  *G06Q 10/10* (2013.01); *G06K 9/00* (2013.01); *G06Q 30/00* (2013.01); *G06K 15/02* (2013.01); *G06Q 20/3827* (2013.01)

(58) Field of Classification Search
USPC .......................................................... 705/50
See application file for complete search history.

(56) References Cited

U.S. PATENT DOCUMENTS

| | | | |
|---|---|---|---|
| 5,781,629 A | 7/1998 | Haber | |
| 5,892,900 A * | 4/1999 | Ginter et al. | 726/26 |
| 7,239,328 B2 * | 7/2007 | Boler et al. | 345/619 |
| 7,673,324 B2 * | 3/2010 | Tirosh et al. | 726/1 |
| 8,086,570 B2 * | 12/2011 | Kawabe et al. | 707/638 |
| 2006/0187241 A1 * | 8/2006 | Boler et al. | 345/660 |
| 2006/0265590 A1 * | 11/2006 | DeYoung et al. | 713/176 |
| 2006/0294152 A1 * | 12/2006 | Kawabe et al. | 707/200 |
| 2007/0192609 A1 * | 8/2007 | Yoshioka et al. | 713/176 |
| 2007/0220614 A1 * | 9/2007 | Ellis et al. | 726/27 |
| 2007/0266237 A1 * | 11/2007 | Kuroki | 713/156 |
| 2008/0025649 A1 * | 1/2008 | Liu et al. | 382/305 |
| 2008/0201580 A1 | 8/2008 | Savitzky et al. | |
| 2008/0243898 A1 * | 10/2008 | Gormish et al. | 707/102 |
| 2010/0212017 A1 * | 8/2010 | Li et al. | 726/26 |

(Continued)

FOREIGN PATENT DOCUMENTS

| | | |
|---|---|---|
| EP | 1962222 | 8/2008 |
| JP | 2003-288428 | 10/2003 |

(Continued)

OTHER PUBLICATIONS

International Search Report, PCT/JP2012/055289, May 22, 2012, 8 pgs.

*Primary Examiner* — Steven Kim
*Assistant Examiner* — Tim Hale
(74) *Attorney, Agent, or Firm* — Patent Law Works LLP

(57) ABSTRACT

A method and system for generating printable certificates to verify log authenticity. A logging module generates a compound document that includes metadata for changes made to pages in a document. Each time a change is made to the document, such as adding stroke data, the logging module updates the compound document with the changes. The online marketplace module displays an option for purchasing a printable certificate. In response to a request for a certificate, the logging module generates a printable certificate that includes a set number of hashes for previous transactions. The verification module can recreate a transaction and generate a hash that is compared to the certificate to verify that no tampering has occurred with the document.

18 Claims, 14 Drawing Sheets

(56) References Cited

U.S. PATENT DOCUMENTS

| | | |
|---|---|---|
| 2011/0060981 A1 | 3/2011 | Piersol et al. |
| 2011/0061092 A1* | 3/2011 | Bailloeul et al. ............... 726/4 |
| 2011/0121066 A1* | 5/2011 | Tian et al. .................. 235/375 |
| 2011/0181616 A1* | 7/2011 | Sayers et al. ................ 345/619 |
| 2011/0313972 A1* | 12/2011 | Albouze ..................... 707/624 |
| 2012/0132701 A1* | 5/2012 | Nakagawa et al. .......... 235/375 |

FOREIGN PATENT DOCUMENTS

| | | |
|---|---|---|
| JP | 2004-236274 | 8/2004 |
| JP | 2008-206158 | 9/2008 |
| JP | 2010-508121 | 3/2010 |
| JP | 2010-108383 | 5/2010 |
| JP | 2011-60286 | 3/2011 |
| WO | WO 96/13921 | 5/1996 |

* cited by examiner

475

Certificate for Document ID #123

Hash | Time
(1) hash 5 for last transaction | 2010052809044792371
(2) hash 4 for second to last transaction | 2010052809032791266
(3) hash 3 for third to last transaction | 2010052711565684582
(4) hash 2 for fourth to last transaction | 2010052612044874383
(5) hash 1 for fifth to last transaction | 2010052409044792371

Figure 4D

GENERATING PRINTABLE CERTIFICATES TO VERIFY LOG AUTHENTICITY

BACKGROUND OF THE INVENTION

1. Field of the Invention

The present embodiment of invention relates to generating a printed certificate of a log. In particular the present invention relates to generating a printed certificate of an entangled log that is used to verify the device that made changes to the document.

2. Description of the Background Art

The use of portable computing devices has become commonplace for many users. In addition to having a conventional desktop computer, many users also have some type of portable computing device. Examples of present-day portable computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

The portable computing devices are used to complete electronic form processing. One type of form processing uses e-mail based workflows. The distribution of electronic forms via e-mail has the advantage of being fast, easily replicable and deliverable in parallel. E-mail based workflows often require that the documents be e-mailed, printed, signed, scanned and e-mailed back. However, existing e-mail based workflows make it difficult if not impossible to add ink like signatures, notes and other sketches to electronic forms. Furthermore, e-mail based workflows fail to provide a system for tracking changes to the electronic forms by different computing devices.

Yet another attempt by the prior art to overcome the shortcomings of form processing has been to provide centralized workflow systems. However, such centralized workflow systems often require that each user log in and require a significant amount of customized programming. Thus, even the smallest change to a workflow cannot be performed immediately. Instead a small change requires a custom modification by a skilled programmer, and typically introduces significant delay before the centralized system matches the desired workflow. Furthermore, such centralized system workflows do not accommodate arbitrary comments or modification of electronic documents. Typically such systems only provide access when a user is fully connected to the system, and users often take documents out of the central system, use a word processor to edit them and then return them to the system. Such centralized workflow systems make it difficult to track users and verify the authenticity of the documents.

SUMMARY OF THE INVENTION

The present embodiment of invention overcomes the deficiencies and limitations of the prior art by providing a method and system for generating a printed certificate of a log. In particular, the present embodiment of the invention provides a portable computing device that records changes to documents and includes the identity of the portable computing device. The workflow server generates a certificate that includes hashes from all devices that interacted with the document. The system is particularly advantageous because it provides proof that the document was authenticated and identifies the devices that interacted with the document in case the devices need to be identified.

In one embodiment, the system of the present invention includes: a plurality of portable computing devices and a computer coupled by a network to a workflow server. In one embodiment, the portable computing devices include a display, stroke capture capability, logging capability and a wireless communication capability. The portable computing devices are adapted to receive images (e.g., forms), add stroke annotations to the received forms, generate a log of the changes and send the annotated received images along with the log to other devices including the workflow server.

The workflow server includes a logging module, a verification module and a transfer module. The workflow server sends and receives documents from the portable computing devices and the computer, maintains a log for verification, implements a paper like workflow for processing the documents and generates a printable certificate to verify the authenticity of the document and to identify devices that interacted with the document.

The present embodiment of the invention also includes a novel method for generating logs of documents, generating a certificate of the logs and paying for the certificate.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 4D is one example of a human-readable printed certificate associated with a document in accordance with the present embodiment of invention.

DETAILED DESCRIPTION OF THE PREFERRED EMBODIMENTS

Figure 1:
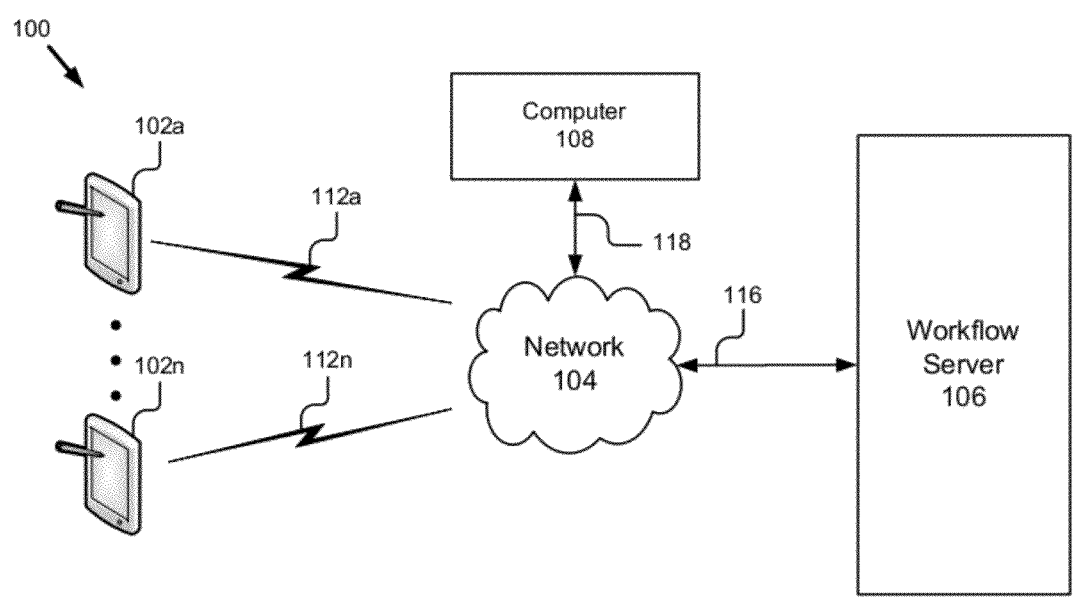
FIG. 1 is a block diagram of an embodiment of a system for routing documents in accordance with the present embodiment of invention.

A system and method for generating a printed certificate of a log is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram document in order to avoid obscuring the invention. For example, the present embodiment of invention is described in one embodiment below with reference to portable computing devices that are exemplified in a hardware and software platform like the Amazon Kindle that utilize electronic paper, e-paper or electronic ink display. However, the present embodiment of invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the document of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the document of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the invention can take the document of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of invention is described with reference to a particular programming language. It will be appreciated that a variety of programming languages may be used to implement the teachings of the invention as described herein.

System Overview

FIG. 1 shows an embodiment of a system 100 for transmitting documents between portable computing devices, a computer and a server. Referring now to FIG. 1, this embodiment of system 100 comprises: a plurality of portable computing devices 102a-102n, a network 104, a computer 108 and a workflow server 106.

The plurality of portable computing devices 102a-102n is wirelessly coupled to the network 104 via respective couplings 112a-112n. The portable computing device 102 is coupled to the workflow server 106 via the network 104. The portable computing devices 102a-102n include a display, stroke capture capability, audio capture capability, gesture recognition capability and a wireless communication capability. The portable computing devices 102a-102n are adapted to receive images (e.g., documents or forms), add stroke annotations to the received images, and send the annotated received images. Embodiments of the portable computing devices 102a-102n will be described in more detail below with reference to FIG. 2A.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer. The computer 108 is coupled to the network 104 by signal line 118. In one embodiment, the computer is used by a developer that can access and communicate with the workflow server 106 to submit an application to the workflow server 106 for uploading onto the online marketplace. In another embodiment the computer is used to initially input a form for processing or verify processing of a particular form according to the workflow. For example, a user may use the computer 108 to input to the workflow server 106 a document such as a portable document format (PDF) file for further processing. Similarly, the computer 108 may be the recipient of a completed form after all processing according to its workflow has been completed. Computer 108 may communicate with a verification module 272 of the workflow server 106 to verify the status or completion of processing of a particular form. Finally, Computer 108 might operate on a document as an intermediate stage of a workflow, or even include some of the capabilities of the workflow server 106, and communicate directly with portable computing devices 102a-102n.

The workflow server 106 is coupled to the network 104 via signal line 116 for communication with the portable computing devices 102a-102n and the computer 108. The workflow server 106 includes modules for receiving data, logging changes in documents, generating certificates of the log, selling certificates of the log, etc. The modules are described in greater detail in FIG. 2B.

In one embodiment, applications are made available on the workflow server 106 and transmitted to the plurality of portable computing devices 102a-102n via the network 104. The application generates a document that is displayed on the portable computing devices 102a-102n. A user inputs data onto the document, for example, by writing on the portable computing device 102a using a stylus. In one embodiment, the application includes a module for translating the stroke information into text. In another embodiment, the stroke data is transmitted to the workflow server 106 for further processing.

Although the system of FIG. 1 shows only one workflow server 106 and one computer 108, it should be understood that there could be any number of additional workflow servers and computers, for example dedicated to other functions, companies, institutions, organizational structures. A computing device 102a-102n may communicate with more than one workflow server 106 or computer 108. Particular pages or sections of a document could be associated with different workflow servers. Also, portions of a compound document can be forwarded rather than sending the entire compound document.

Portable Computing Device 102

Figure 2A:
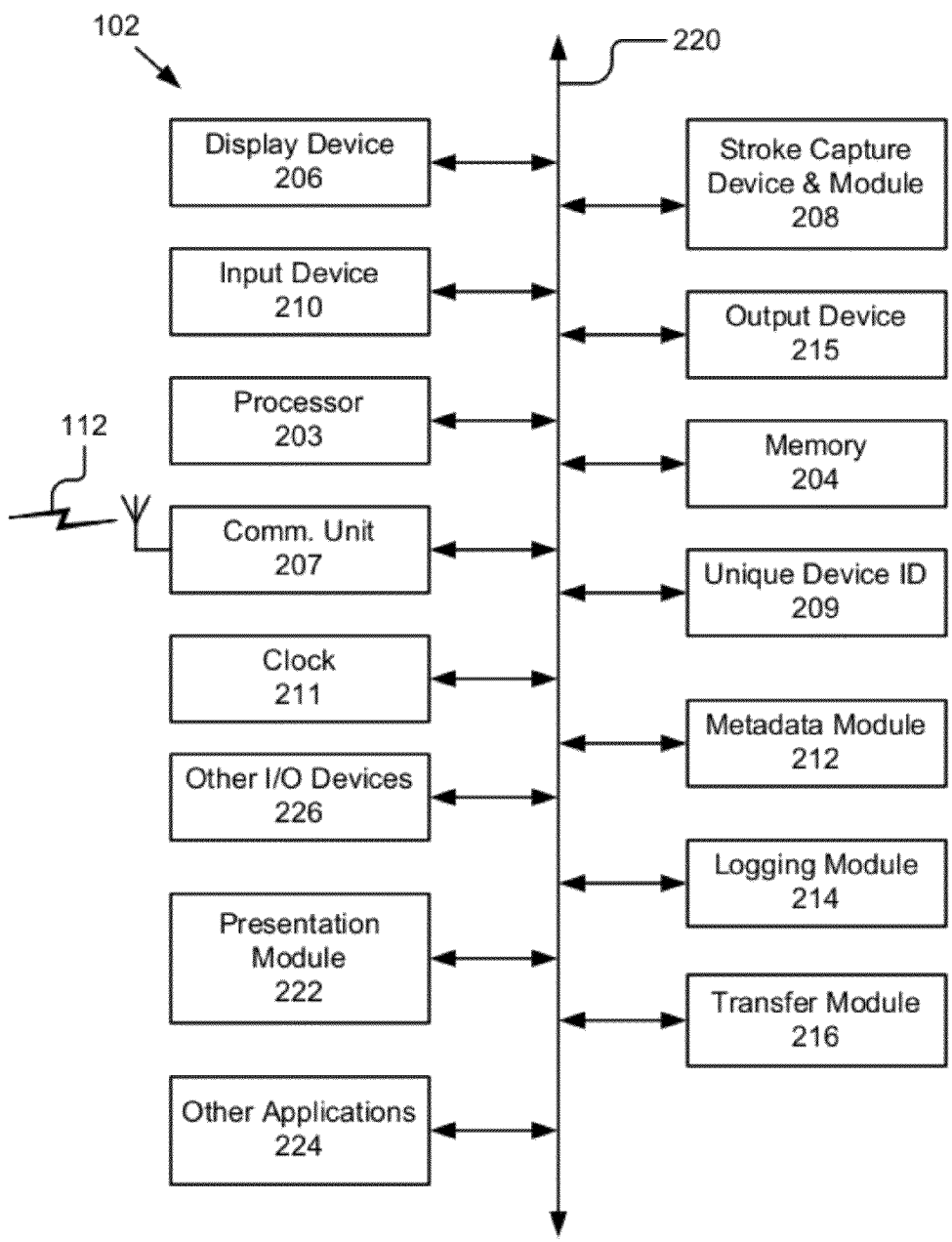
FIG. 2A is a block diagram of an embodiment of a portable computing device in accordance with the present embodiment of invention.

Referring now to FIG. 2A, the components of a portable computing device 102 are described. The portable computing device 102 comprises a display device 206, a stroke capture device and module 208, an input device 210, an output device 215, a processor 203, a memory 204, a communication unit 207, a unique device ID 209, a clock 211, a metadata module 212, other input/output (I/O) devices 226, a logging module 214, a presentation module 222, a transfer module 216 and other applications 224.

The processor 203 comprises an arithmetic logic unit, a microprocessor, a general purpose controller or some other processor array to perform computations, provide electronic display signals to display device 206, and detect and process stroke inputs. The processor 203 is coupled to the bus 220 for communication with the other components of the computing device 102. Processor 203 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability of the computing device 102 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing device 102 also includes an operating system executable by the processor such as but not limited to WINDOWS®, MacOS X, Android, or UNIX® based operating systems.

The memory 204 stores instructions and/or data that may be executed by processor 203. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory such as a hard disk drive or flash drive for storing log information on a more permanent basis. The memory 204 is coupled by the bus 220 for communication with the other components of the computing device 102.

The communication unit 207 is coupled to an antenna and the bus 220. An alternate embodiment, the communication unit 207 may provide a port for direct physical connection to the network 104. The communication unit 207 includes a transceiver for sending and receiving compound documents. In one embodiment, the communication unit 207 includes a Wi-Fi transceiver for wireless communication with an access point. In another embodiment, the communication unit 207 includes a Bluetooth® transceiver for wireless communication with other devices. In yet another embodiment, the communication unit 207 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 207 includes ports for wired connectivity such as but not limited to USB, SD, or CAT-5, etc. The communication unit 207 links the processor 203 to the network 104 that may include multiple processing systems. The network of processing systems may comprise a local area network (LAN), a wide area network (WAN) (e.g., the Internet), and/or any other interconnected data path across which multiple devices may communicate. The communication unit 207 also provides other conventional connections to the network 104 for distribution of files (media objects) using standard network protocols such as TCP/IP, HTTP, SSH, git HTTPS and SMTP as will be understood to those skilled in the art.

The computing device 102 includes storage for a unique device identifier 209. The computing device 102 is coupled to the bus 220 to provide the unique identifier to other components as needed. In one embodiment, the storage is read only memory for storing the unique device identifier 209. In another embodiment, the unique device identifier 209 is a nonvolatile storage storing a public key-private key pair. In another embodiment, the public key-private key pair is stored within a specialized trusted computing memory integrated with the CPU or main board of the device. It is useful for the computing device 102 to have a unique identifier that is used to verify the authenticity of the user to ensure that changes made to an application were performed by an authorized entity.

In one embodiment, the unique device identifier 209 is the hardware MAC address of a network chip in the computing device 102. The unique device identifier 209 may be an internal part of another functional block, such as the communication unit 207, or in nonvolatile storage in memory unit 204. In another embodiment, the unique identifier is a unique ID associated with a memory card on the computing device 102, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing device 102 is manufactured with or configured with a private key and the public key disseminated. Then the computing device 102 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing device 102.

The clock 211 is a conventional type and provides an indication of local time for the computing device 102. In particular, the clock 211 is used to provide a local time at which compound documents are processed. This time value is also stored with data in the local log files using the logging module 214. The clock 211 is adapted to communicate this information to the processor 203 and the logging module 214 using the system bus 220.

The metadata module 212 is software including routines for extracting metadata from a document or image and storing metadata as part of a document. In one embodiment, the metadata module 212 is instructions executable by the processor 203 to provide the functionality described below with reference to FIGS. 7-9C for generating and extracting metadata. In one embodiment, the metadata module 212 is stored in the memory 204 and is accessible and executable by the processor 203. In any event, the metadata module 212 is adapted for cooperation and communication with the processor 203, the logging module 214 and other components of the computing device 102.

The logging module 214 is software including routines for creating and storing local logs in the memory 204, and more particularly, in a nonvolatile storage portion of the memory 204 and for generating certificates of the log. In one embodiment, the logging module 214 is a set of routines executable by the processor 203 to store metadata in an entangled log at the computing device 102. The logging module 214 is particularly critical to provide verification of workflow completion in transactions. In one embodiment, the logging module 214 also includes routines for publishing or storing in a publicly available location on the network the logs of its particular computing device 102. The logging module 214 is coupled by the bus 220 to the processor 203, the memory 204, and the communication unit 207. FIG. 3B below illustrates an example of the type of information that is stored in a log, FIG. 4B illustrates a compound document that includes all the metadata and FIG. 4C illustrates an example of a document directory.

The logging module 214 generates a cryptographic hash associated with each log entry hash data including the cryptographic hash of the previous log entry. The series of hashes that each include the last hash is called a chained hash. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in U.S. Pat. No. 7,849,053 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are each herein incorporated by reference in their entirety.

The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are each herein incorporated by reference in their entirety. Thus logs including cryptographic hashes or CBIs are maintained. The CBI of the recent log entries are stored in other log files and published via email or other protocols. These CBIs can later be used to verify that the log was not modified since the time the CBI was published.

The transfer module 216 is software and routines for transmitting and receiving applications and documents to and from the workflow server 106 and the computer 108. In one embodiment, the transfer module 216 transmits applications to the workflow server 106 for display in the online marketplace. In other embodiments, the transfer module 216 sends and receives documents as formatted messages from any other computing device such as the workflow server 106 and the computer 108. The transfer module 216 is coupled by the bus 220 for communication with the processor 203 and the communication unit 207. The transfer module 216 is responsible for transmitting and receiving the application, document or formatted message from the portable computing device 102 such as by email, file transfer, XMPP or special purpose application.

Aligned with the display device 206, there is a stroke capture device and module 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from a stylus, a finger or another implement. The stroke capture device 208 is a sensor for the stylus and has resolution sufficient to capture recognizable handwriting and printing and other drawings. In one embodiment, display device 206 is equipped with a touch screen in which a touch sensitive, transparent panel covers the screen of display device 206. The stroke capture device 208 and the display device 206 are coupled by the bus 220 to the memory 204, the processor 203, the presentation module 222 and the communication unit 207.

In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208. The stroke capture module 208 is software and routines for receiving stroke data, dividing the strokes into segments, and applying character recognition to the segments.

The bus 220 represents a shared bus for communicating information and data throughout the computing device 102. The bus 220 may represent one or more buses including an industry standard architecture (ISA) bus, a peripheral component interconnect (PCI) bus, a universal serial bus (USB), or some other bus known in the art to provide similar functionality. Additional components coupled to processor 203 through system bus 220 include the display device 206, the stroke capture device and module 208, the input device 210, the output device 215, the processor 203, the memory 204, the communication unit 207, the unique device identifier 209, the clock 211, the metadata module 212, the logging module 214, the transfer module 216, the presentation module 222 and the other applications 224. There may also be a plurality of busses in computing system 102, designed to provide the most efficient communications between functional elements.

The presentation module 222 is software and routines for displaying documents on the display device 206, and adjusting the display of the image responsive to input from input device 210. The presentation module 222 performs routines that cause the dual mode user interface to be displayed. In one embodiment, the presentation module 222 is a thin client routine executable by the processor 203 to cause display of the image on the display device 206. The presentation module 222 is coupled by the bus 220 to the display device 206, the processor 203, and the memory 204.

The other applications 224 include other software and routines executable by the processor 203 for various other types of functionality. In one embodiment, one or more application programs are executed by the processor 203 including, without limitation, word processing applications, electronic mail applications, financial applications, and web browser applications.

Finally, the computing device 102 may include one or more other I/O devices 226. For example, the other I/O devices 226 may include speakers to produce sound, microphones to record sound, a scanner or camera to record documents, images or video, and other sensors or feedback devices like accelerometers, pager motors, or haptic feedback. Optionally, the other I/O devices 226 may include one or more analog-to-digital or digital-to-analog converters, and/or one or more digital signal processors to facilitate audio processing. These other I/O devices 226 are coupled by bus 220 for communication with the processor 203 and the memory 204. Optionally, a microcontroller may be added as part of other I/O Devices 226 to facilitate power systems control, as well as off-load the main processor 203 from lower-speed lesser-important tasks.

Workflow Server 106

Figure 2B:
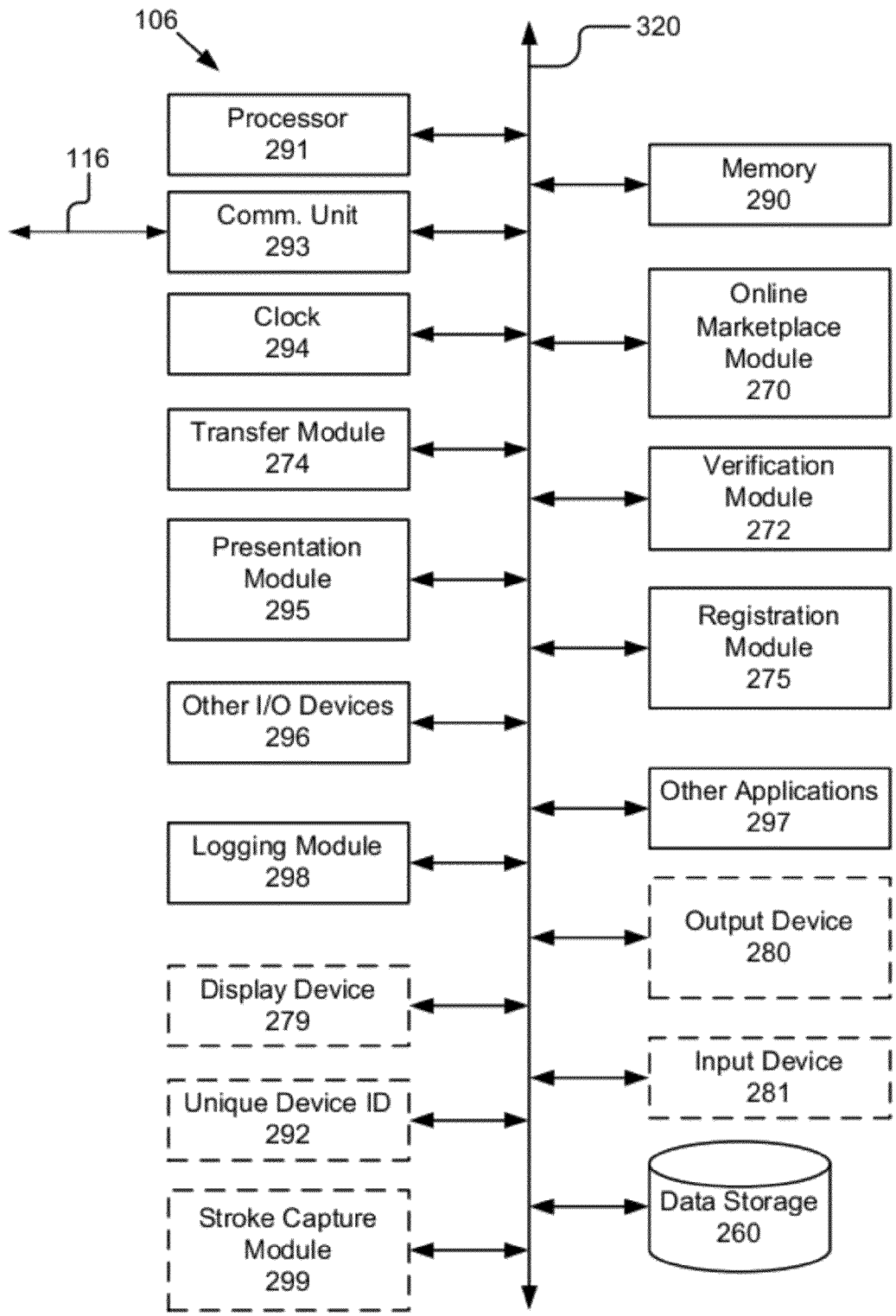
FIG. 2B is a block diagram of a workflow server in accordance with the present embodiment of invention.

Referring now to FIG. 2B, an embodiment of the workflow server 106 will be described in more detail. The workflow server 106 comprises a processor 291, a memory 290, a communication unit 293, an online marketplace module 270, a clock 294, a transfer module 274, a verification module 272, a presentation module 295, a registration module 275, other input/output devices 296, other applications 297, a logging module 298 and data storage 260. In an alternate embodiment, the workflow server 106 further comprises a display device 279, an output device 280, a unique device ID 292, an input device 281 and a stroke capture module 299.

Those skilled in the art will recognize that some of the components of the workflow server 106 have the same or similar functionality to the components of the computing device 102 so descriptions of these components will not be repeated here. For example, the processor 291, the memory 290, the communication unit 293, the logging module 298, the clock 294, the transfer module 274, the presentation module 295, the other input/output devices 296, the other applications 297, the display device 279, the output device 280, the unique device ID 292, the input device 281 have a similar functionality to the processor 203, the memory 204, the communication unit 207, the logging module 214, the clock 211, the transfer module 216, the presentation module 222, the other input/output devices 226, the other applications 224, the display device 206, the output device 215, the unique device ID 209 and the input device 210 of FIG. 2A, respectively.

Some differences between the components of the workflow server 106 and the computing device 102 are noted below. For example, the communication unit 293 may couple the workflow server 106 to the network 104 in a wired manner instead of wirelessly. The processor 291 is more computationally powerful than the processor 203 as the workflow server 106 likely services numerous portable computing devices 102. The transfer module 274 is an e-mail server as opposed to an e-mail client. The display device 279 may be a cathode-ray tube, and the output device 280 is a set of speakers. The input device 281 includes a keyboard and mouse type controller. Those skilled in the art will recognize that there may be a variety of other differences as the components of the workflow server 106 acts as a hardware server as opposed to a remote client.

The logging module 298 generates a global document log from the logs that are transmitted from the different portable computing devices 102. The global document log is a central log of all activities that occurred with the document at the different portable computing devices 102. The global document log includes the hashes from the page logs but not the details regarding what specifically occurred during each transaction. The specific actions can be recreated by retrieving the metadata associated with the document. The global document log is described in greater detail with reference to FIG. 3D.

The registration module 275 is software and routines for generating identifiers and formalizing applications for being uploaded to the online marketplace module 270. In one embodiment, the registration module 275 is a routine executable by the processor 294 to generate identifiers and secret keys. The application is registered and transmitted to the online marketplace module 270 for uploading. The registration module 275 is coupled by the bus 320 to the processor 291, the memory 290 and the online marketplace module 270.

The online marketplace module 270 is software and routines for uploading applications to an online store, presenting applications for purchase, billing users that purchase applications or order certificates and distributing credits to software developers and the workflow server 106. In one embodiment, the online marketplace module 270 is a routine executable by the processor 291 to bill a user for the initial purchase of an application and a subsequent fee for additional services as a monthly flat fee or per service. In another embodiment, the online marketplace module 270 is a routine executable by the processor 291 to bill the user for the purchase of a certificate of the log associated with a document. The online marketplace module 270 is coupled to the processor 291, the memory 290 and the registration module 275.

The verification module 272 of the workflow server 106 is software and routines for verifying the processing of a compound document 400 and verifying the authenticity of a printed certificate. In one embodiment, the verification module 272 is routines executable by the processor 291 to perform verification of certificates as described below with reference to FIG. 7. The verification module 272 also serves as an intermediate between transmission of documents between portable computing devices 102, the computer 108 or uploading to the online marketplace. The verification module 272 is coupled by bus 320 to the processor 291, the memory 290 and the communication unit 293. Note that the verification module 272 might be used independently of the workflow server 106. In fact, it might run on the computer 108 for independent verification of documents without need to trust a particular server.

In one embodiment, the data storage 260 is part of the workflow server 106. In an alternate embodiment, data storage 260 is coupled to the workflow server 106. For example, in such an alternate embodiment, the data storage 260 is an online storage service such as Amazon S3. The data storage 260 is a non-volatile memory device or similar permanent storage device and media. Data storage device 260 stores data and instructions for processor 291 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 260 is used to store the applications and associated metadata including hashes, identifiers, secret keys, signatures, etc.

Format of the Document, Pages and Metadata

Figure 3A:
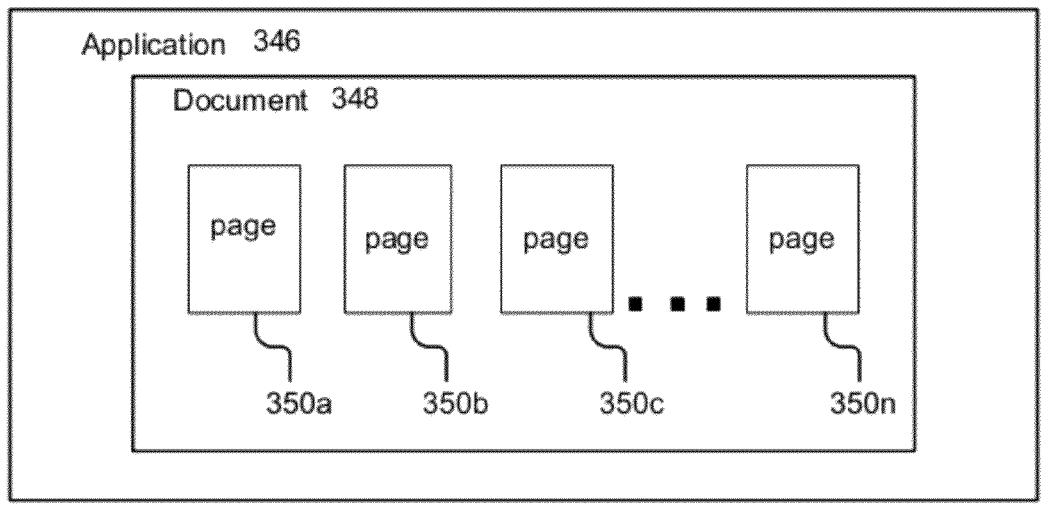
FIG. 3A is a block diagram of an application for generating a document with pages in accordance with the present embodiment of invention.
Figure 3B:
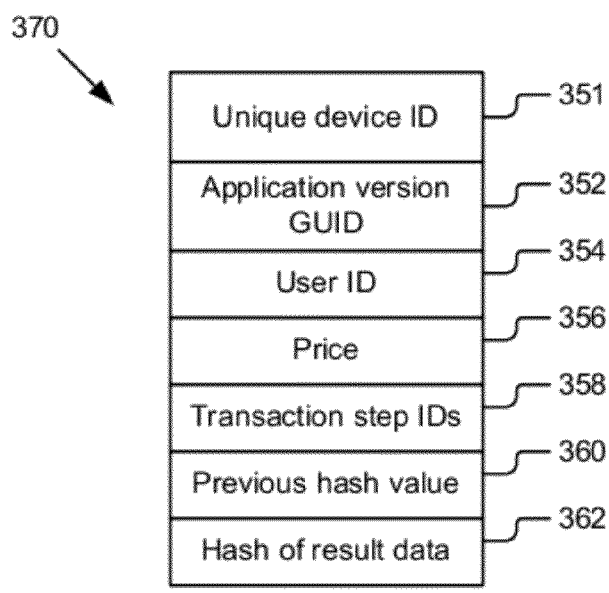
FIG. 3B is a graphical representation of a log entry in accordance with the present embodiment of invention.

To aid in understanding the differences between an application, a document and pages, FIG. 3A illustrates a graphical representation of an application 346. An application 346 includes software and routines for generating a document 348 or the document 348 is generated by other tools associated with that application 346. In one embodiment, an application 346 includes different modules for performing tasks, such as speech recognition, or the modules are be purchased separately. The document 348 comprises pages 350a, 350b, 350c . . . 350n. In one embodiment, a user purchases an application 346, generates a document 348 and provides information to fill out the pages 350a . . . n.

Each page of a document and the document itself include a log of metadata. FIG. 3B illustrates one embodiment of a log entry 370 of metadata that is generated for each page and for a document log. In this example, a unique device ID 351 identifies the most recent computing device, such as a portable computing device 102 that makes a modification to the document. The application version GUID 352 is the identifier for the application being used. The user ID 354 identifies the most recent user to modify the document. The price 356 includes the price of the purchased application, the price of any subsequent actions to be performed, etc.

The transaction step IDs 358 include all the steps that have been performed and will be performed on the application. This is used to track the status of the application as it is transmitted between portable computing devices 102 and the workflow server 106. For example, a portable computing device 102 purchases the application and inputs audio information into the document. The document is transmitted back to the workflow server 106 for translation services. Once the speech is translated to text, the translated document is transmitted back to the portable computing device 102. All these steps are recorded and tracked by the transaction step IDs 358.

The previous hash value 360 is the hash value of the prior log entry in the local log of the last computing device that modified the document. The hash of the result data 362 is a hash calculation of the results from this particular transaction. Each hash includes the cryptographic hash of the previous log entry. By including the hash value of the prior log entry, this information can be used at a later time and examined for verification by comparison with other entangled log entries. In another embodiment, the log entry 370 also includes a hash of the document or perhaps multiple hashes of portions of the document.

The cryptographic hashes are also called content based identifiers (CBIs) because they can be used to index data in addition to their use for verification. The CBI of the recent log entries are stored in other log files and published via email or other protocols. Maintaining logs that allow recreation of the document and the CBI for any data needed to redo the operation in the log file. The data itself is stored in the metadata directories for the pages and document, as discussed in further detail with regard to FIGS. 4A-C.

Figure 3C:
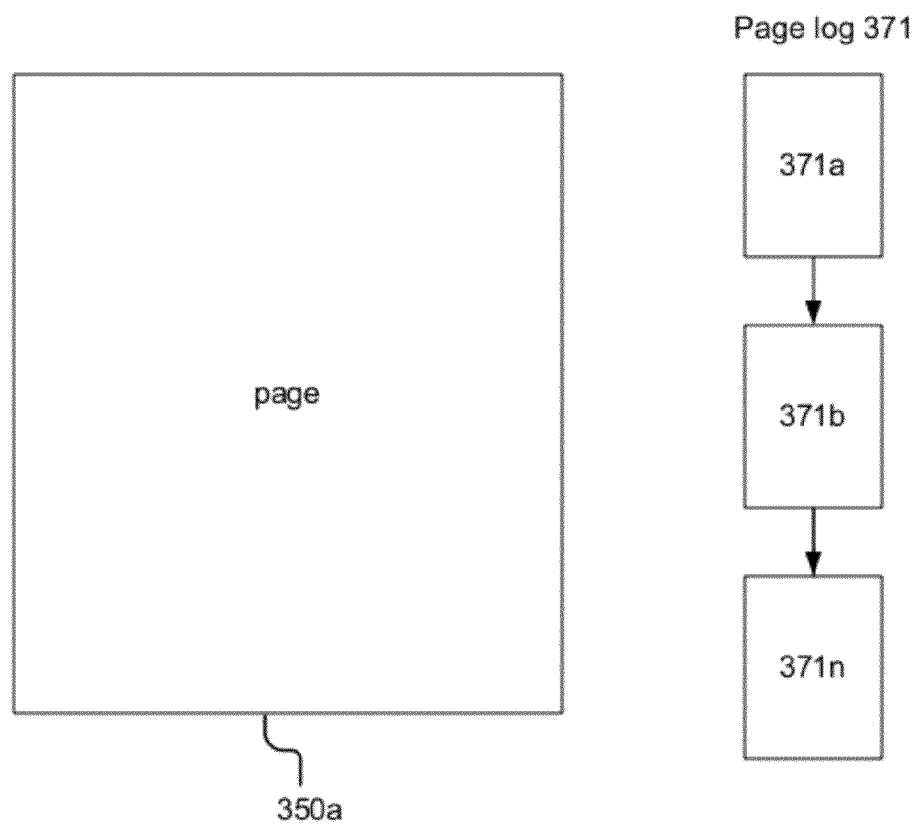
FIG. 3C is a graphical representation of a page log in accordance with the present embodiment of invention.

Turning now to FIG. 3C, a page 350a-350n (See FIG. 3A) and its corresponding page log 371 is illustrated. The document 348 comprises pages 350a that each includes their own page log 371. When a change is made to the document, a new hash is generated and the log is updated. Thus, 371a is a log for the original document, 371b is a log after a change is made to the document and 371n is a log after n changes have been made to the document.

Figure 3D:
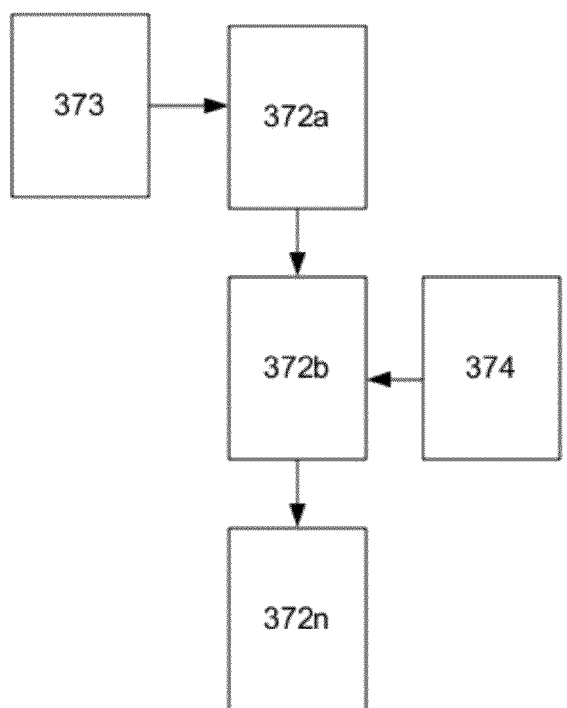
FIG. 3D is a graphical representation of a document log in accordance with the present invention.

FIG. 3D illustrates an example document log 372. A document log 372 is associated with the document as a whole and is referred to as an entangled log when the document log 372 includes log entry hashes from different computing devices. The document log 372 is stored as a file or collection of files associated with the document. In addition, the global document log is stored on the workflow server 106, which coordinates transmission of the document based on the authenticity of the document log. Further details regarding authentication of the logs can be found in U.S. patent application Ser. No. 13/020,643, filed on Feb. 3, 2011 and titled "Creation of Signatures for Authenticating Applications," which is herein incorporated by reference in its entirety.

In this example a portable computing device 102 generates a page log 373 after the portable computing device 102 makes modifications to the document. The page log 373 is included into the document log 372a for the entire document. The document log 372a does not list the exact modification that was made to the page. Instead, the document log 372a includes a hash of the changes that were made and a pointer to the location of information inside the directory, which is described in FIGS. 4B and 4C. Another modification is made to a page log 374 and page log 374 is included into the document log 372b. All n modifications are included into the document log 372n.

Logging Module 298

Figure 4A:
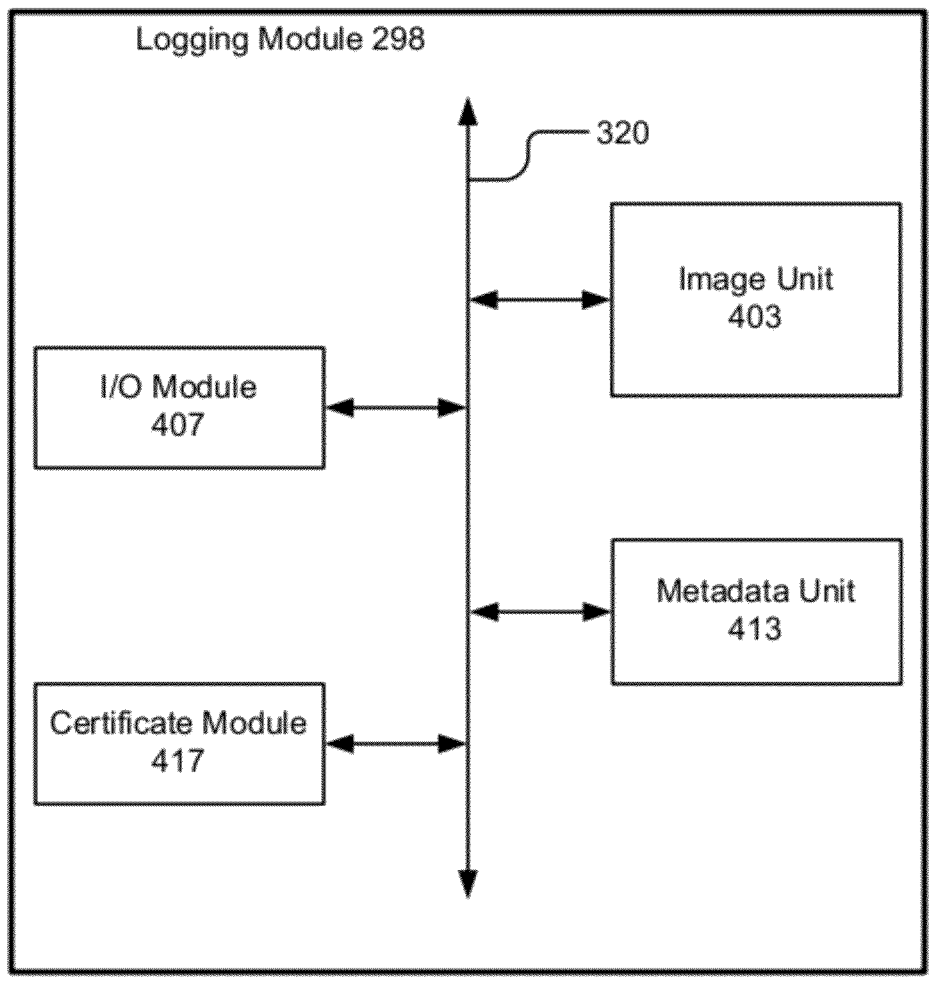
FIG. 4A is logging module in accordance with the present embodiment of invention.
Figure 4B:
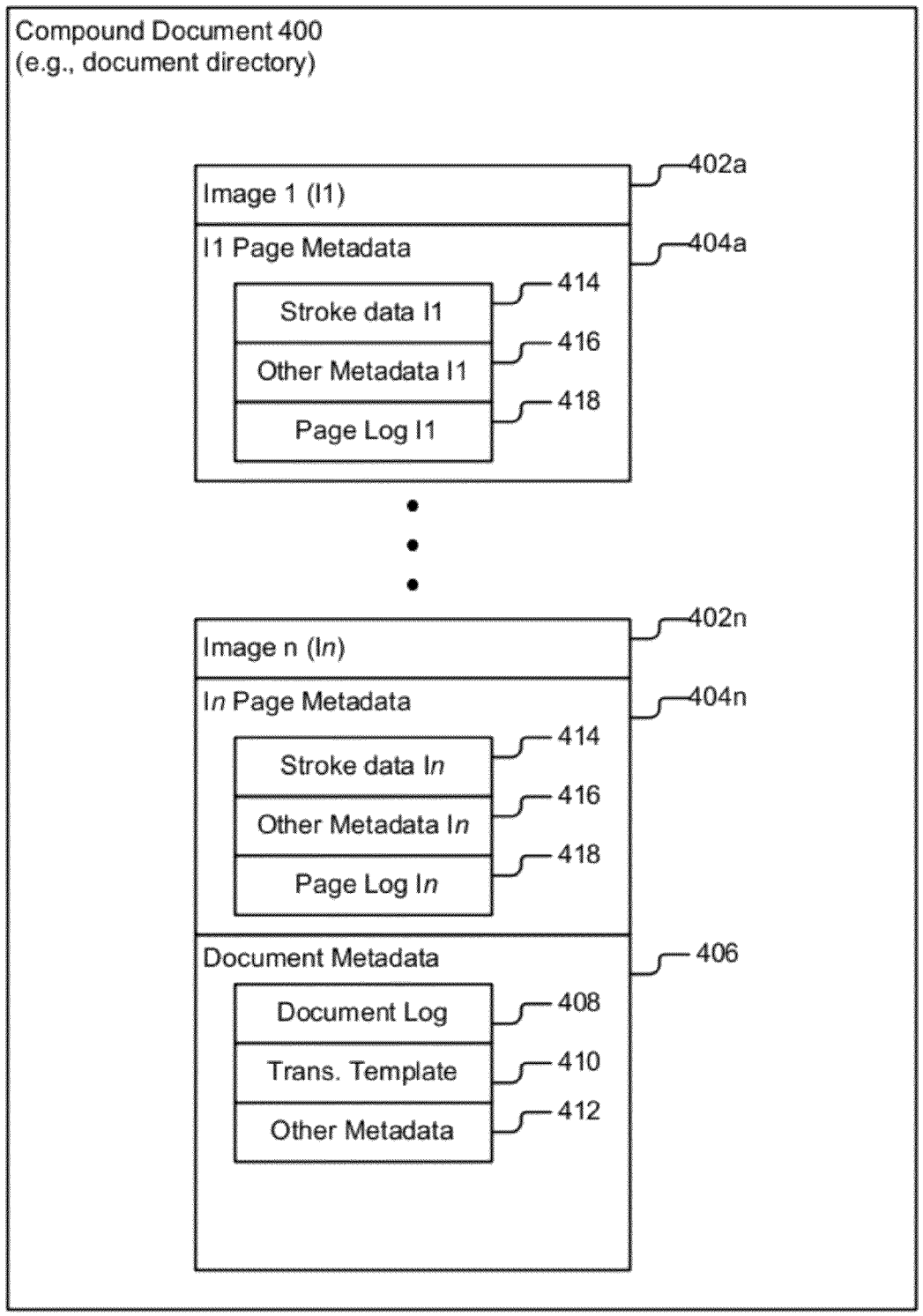
FIG. 4B is a block diagram representing an embodiment of a compound document in accordance with the present embodiment of invention.
Figure 4C:
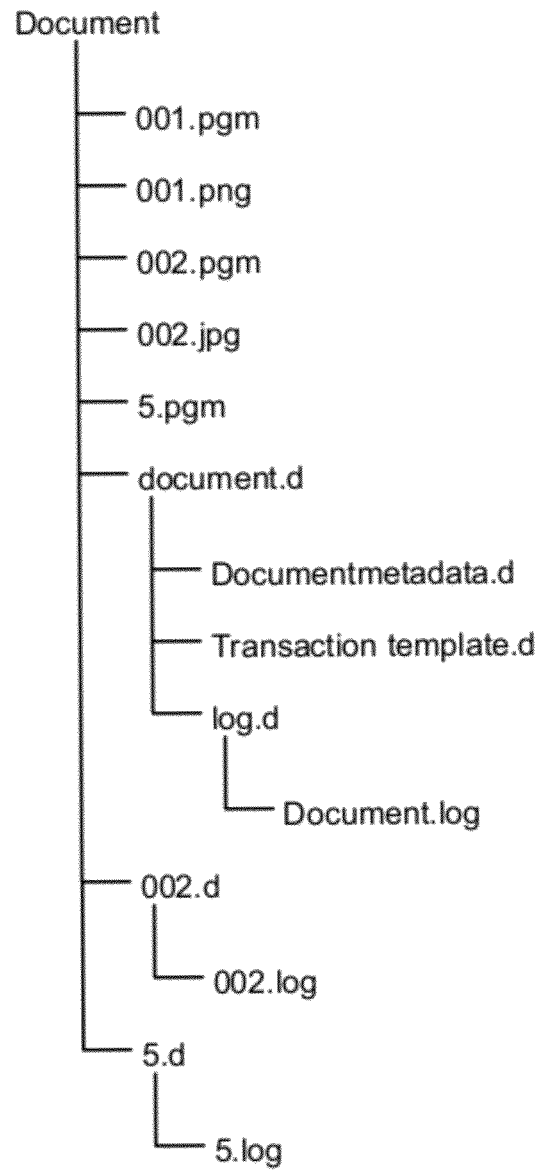
FIG. 4C is one example of a compound document in accordance with the present embodiment of invention.

FIG. 4A illustrates an embodiment of a logging module 298 that comprises an input/output module 407, an image unit 403, a metadata unit 413 and a certificate module 417 that are coupled to the bus 320. The input/output module 407 receives data from other modules, such as stroke segments from the stroke capture device and module 208 and transmits the images to the image unit 403 and the metadata to the metadata unit 413.

The image unit 403 receives an image and generates a raster form of the image that is transmitted to the metadata unit 413 for incorporation in a metadata directory for the page. The metadata unit 413 receives all metadata and stores information about changes on a page such as page creation, writing on a page and adding an image to a page. The logging module 214 also stores a timestamp for when a page is submitted or otherwise copied from one place, such as a portable computing device 102 to another place, such as the workflow server 106.

The certificate module 417 generates a printable certificate in response to a request from a user. In one embodiment, the user purchases the certificate from the online marketplace. To generate the certificate, the certificate module 417 retrieves the succeeding entries for the hash chained log and prints out a human readable certificate showing the document hashes for the succeeding entries. In one embodiment, the user manually selects the number of succeeding entries. In another embodiment, the number is automatically generated by the certificate module 417. An example 475 of a certificate is illustrated in FIG. 4D.

FIG. 4B illustrates a compound document 400. In this example, the compound document 400 includes a plurality of images 402a-402n that are denoted in the figure as Image 1 (I1) . . . Image n (In). Each of the plurality of images 402a-402n may include associated page or image metadata 404a-404n. The page or image metadata 404a-404n includes stroke data 414, other metadata 416 and page log 418. Furthermore, the entire compound document 400 includes document metadata 406. The document metadata 406 includes a document log 408, a transaction template 410 and other document metadata 412.

The present invention advantageously stores the pages of the compound document 400 as images. This is particularly advantageous because it avoids requiring that the portable computing device 102 support a wide range of document formats. Providing pure images, i.e. not documents requiring rendering, to the portable computing device 102 ensures a consistent view and eliminates problems with inability to render fonts or other graphical commands.

When a page is created a raster form of the image is saved in the metadata directory for the page. The page log 418 is initialized with a "start log entry." The start log entry includes the current time as measured on the portable computing device 102 and might include a CBI from another log to establish that the page was created after the time of that CBI. In addition to the "start log entry," the logging module 214 stores a "page created" entry that includes the hash of the raster form of the starting image.

If the CBI of the page log 418 is published after the page is created, then it is possible to use that CBI to check if the page log 418 has been tampered with. If the page log 418 has not been modified, then the steps in the page log 418 can be followed. At first the only entry is the 'page created' entry. The CBI for the page image can be checked, and if it matches the raster image in the page metadata directory 404, then the format of the initial page is known not to have been tampered with since creation.

When strokes are added to a page, they are displayed in raster format on the display device 206, and they are stored in a stroke data file 414 in the metadata directory 404 for the page. A log entry is added to the page log 418, typically including the time and the CBI for the stroke file 414. Thus at a later point, if the page log 418 is verified, then the stroke data file 414 can be verified and the background image can be verified, if all of these items have not been modified then the stroke data file 414 can be used to redraw the strokes on the background image, thus recreating the page as it looked after strokes were added.

Note that to maintain pixel accuracy, the present invention uses a known algorithm to convert the stroke data file 414 to pixels. If multiple algorithms are used, or an algorithm is used with some parameters, e.g. stroke width, then the entry for 'strokes added' should include information identifying the exact algorithm used and the parameters to that algorithm.

Just as strokes may be added to a page, images may be added to a page. In this case the image added to a page should be stored in raster format in the page metadata directory 404. The operation "image added" and the location and scale used to add the image e.g. (500,300) should be stored in the page log 418, along with the CBI of the raster form of the image.

Many applications can operate on the portable computing device 102 that only update pages by adding images or adding strokes. If additional changes are made to the page then log entries for these operations must be defined, the name of the operation must be stored in the log, and the hash of the data must be stored in the log. When a log entry is added to a page log 418, the unique device ID 351 of the portable computing device 102 is included in the entry. If a device is configured with a private key, then it might provide a digital signature of the stroke data 414 to indicate that the stroke date 414 was captured on the portable computing device 102. This signature is included in the page log 418.

Just as a page log 418 is created in a page metadata directory 404 when a new page is created, the logging module 214 creates a document log 408 in the document metadata directory 406 when a document is formed. This document log 408 is used to record items including the addition of pages to a document, when pages are viewed, and when the document as a whole is submitted. Also changes to document level metadata 406 are recorded in this document log 408. While it is possible to repeat the information stored in a page log 418 in the overall document log 408 (along with a page identifier), the logging module 314 records just the CBI for the last entry in page log 418 when the page log 418 is updated. By storing the CBI from the page log 418 in the document log 408, the document log 408 is used to verify all the page logs 418. Whenever new entries are made to a page log 418, then an entry needs to be made to the document log 408, specifying that the page log 418 of the altered page has been altered, and incorporating the most recent CBI of the altered page log 418. The CBI from the document log 408 is then published by email or other methods, rather than needing to publish information from each individual page log 418.

Entries in the document log 408 are similar to the page logs 418: they should include an "operation" and the CBI of any data necessary to complete the operation. In the case of a page view, the log entry includes the identifier for the page, along with the CBI of the current raster format of the page image. Note that some log formats allow the direct inclusion of text and CBIs in the same log entry, while other log formats only allow CBIs. In the event the log format only allows CBIs, the text for the "operation" is stored in a file in the document metadata directory 406 and the CBI of that file included in the log. When the "operation" has no parameters, e.g. "strokes added" then the same file with the text of the operation can be stored once in the metadata directory and the CBI used multiple times. Of course the CBI of the actual stroke file is expected to differ in most cases, and the log entries have time stamps that differentiate individual entries. However, it is possible that a particular log entry with an identical set of log entry data will be written to multiple places with an identical CBI. This in no way invalidates the verification properties of either the page log 418 or the document log 408.

In one embodiment, the document metadata 406 also includes a transaction template 410 to identify the services to be provided and/or completed and other metadata 412. The transaction template 410 is a standard metadata item of the compound document 400. The transaction template 410 either includes a list of service transactions or is a uniform resource locator (URL) pointing to a description of service transactions. When the compound document 400 is to be processed by the workflow server 106, then the transaction template must be attached to the compound document 400. Over the life of the compound document 400, more than one transaction template, and the associated processing, might be applied. The most recent transaction template 410 is always used for processing. The transaction template 410 includes a list of entries, each of which is defined as a step identifier including: an input type, an output type, and a preferred service provider.

Document Format

In one embodiment, the basic format or structure of the document is a directory of including one or more files and directories. Inside the directory are a series of page images, as well as optional metadata. The metadata may be associated independently with each page, and/or metadata may be associated with the document as a whole. Such metadata is stored in further nested directories, and is optional. In one embodiment, each pages of the document is stored as an image. This is particularly advantageous because it avoids requiring that the portable computing device 102 support a wide range of document formats. Providing pure images, i.e. not files requiring rendering, to the portable computing device 102 ensures a consistent view and eliminates problems with inability to render fonts or other graphical commands. In one embodiment, the images are in one of the following file formats: JPEG, JPEG2000, JPM, PNG, PDF, TIFF or simple portable bit map (PBM) file format. Those skilled in the art will recognize that the document directories can be transferred and stored as standard ZIP format archives.

Multiple page image files which share the same initial name segment are considered to be alternate representations of the file, of equivalent quality, and the presentation module 222 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or common intermediate format (cif) identifies the resolution of the images. In another embodiment, the alternate resolutions might be stored with a similar naming convention in the "page001.document.d" metadata directory.

Each of the plurality of images may include associated page or image metadata. The page or image metadata includes stroke data, other metadata and log data. For example, the page or image metadata may also include picture rectangles that identify areas in images at which capture images may be embedded or placed. Furthermore, the entire document includes document metadata. The document metadata includes a document log and other document metadata.

The metadata for the document is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method. A metadata directory may itself include subdirectories, whose contents are ordered and defined according to the creator of that directory. General policy is that applications which do not understand the contents of a metadata file or directory should preserve the contents and should not alter it. As a given metadata file or directory is self contained, there should not be any dependencies between items of metadata unless they are included in the same directory. Items of metadata are connected either to the document as a whole, or a specific page.

In one embodiment, the document metadata 406 is global metadata and is stored in a directory including one or more files, named "memphis.document.d". This directory is included at the top level directory. It is useful to store a log of actions associated with a document in the document metadata. In one embodiment, the logging module 214 also stores a version of an "original" document as document metadata. For example if the document was formed from a PDF, Microsoft Word, Microsoft Excel or other document, the original format document may be saved in the metadata directory.

In one embodiment, the page or image metadata is named with the same name segment as the page image, and ends in the extension ".d". For example, if the page image is named "page.001.jpg", the page metadata directory should be named "page.001.d" to indicate that it is associated with that page. In another embodiment, the page or image metadata includes the original image in some format for each page in the page metadata directory. This metadata is created as soon as the document is created e.g. by storing a raster format both at the top level directory and in the page metadata directory, or a copy of the original raster format may be stored when the page image is first changed. In other embodiments, the page or image metadata includes log data. This log data represents a log for changes applied to each page in the metadata directory for the page. The other metadata is used to store any other data related to a particular page or image. For example, if images are added to a page, it is useful to store these added images in the page metadata directory. An image might be added to a page for reasons similar to "stamping" a paper page, e.g. "received" or "submitted" thus providing a visual indication of the status of the page to any reader.

Multiple page image files which share the same initial name segment are considered to be alternate representations of the file, of equivalent quality, and the presentation module 222 may choose the representation most convenient for its use. So, for example as shown in FIG. 4C, a directory with the following contents: 001.pgm, 001.png, 002.pgm, 002.jpg and 5.pgm would yield a document with three pages. The first page is represented by one of two files, 001.pgm or 001.png. The second page is represented by one of two files, 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif identifies the resolution of the images.

Printed Certificate

Turning now to FIG. 4D, an example 475 of a printed certificate is illustrated. In this example, hashes for the last five changes and the time that the transaction occurred are illustrated. Because each hash is generated using a unique identifier for the device that generated the hash, the company that prompted the change is determined from the hash. Furthermore, because each hash includes the previous hash and because a verification check is performed before the certificate is generated, the printed certificate is authentic. In one embodiment, the hashes are represented in a three dimensional barcode. The barcode can then be scanned by a scanner instead of having to manually input the hashes.

Online Marketplace Module 270

Figure 5:
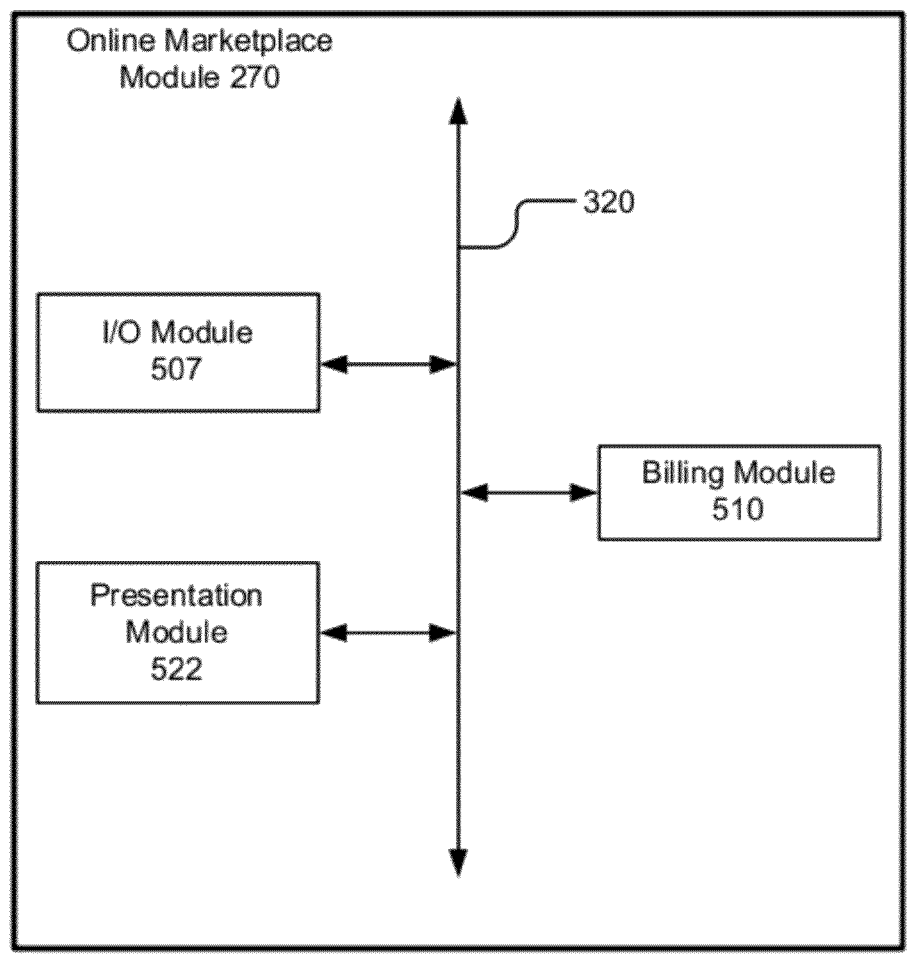
FIG. 5 is an embodiment of the online marketplace in accordance with the present embodiment of invention.

FIG. 5 is one embodiment of an online marketplace module 270 that comprises: an I/O module 507, a billing module 510 and a presentation module 522 that are coupled by bus 320 to communicate with the processor 291, the memory 290 and the communication unit 293.

The billing module 510 is software and routines executable by the processor 291 for billing a requesting party for processing of transactions that have been completed. The transactions include purchasing an application, performing a task, purchasing a suite of applications and/or modules, purchasing a customized document and purchasing a certificate. Additional information about the purchasing of applications, modules and documents can be found in U.S. application Ser. No. 13/020,643 titled "Creation of Signatures for Authenticating Applications," filed Feb. 3, 2011, which is herein incorporated by reference.

For a printed certificate, the billing module 510 generates a variety of options. For example, a human-readable certificate with the last transaction costs a certain amount of money. A certificate with the last five transactions costs more. A certificate with all the transactions costs more if it exceeds five transactions. In another embodiment, the billing module 510 charges for a certificate related to a specific portable computing device 102 or computer 108 that interacted with a document.

In one embodiment, the billing module 510 includes a list of authorized requesting parties, associated portable computing devices 102, the computer 108, identification numbers, billing addresses, payment type and data, and other security and billing information. The billing module 510 transmits an invoice to the requesting party or automatically charges a credit card.

Each step in a paper-like process is considered a transaction. In one embodiment, the prices have been negotiated and set by the workflow server 106 or the computer 108. In another embodiment, the billing module 510 dynamically determines the price for a particular transaction based on a number of service providers available on the network, the number of service providers that can perform the transaction, whether this a first attempt at the transaction, the quality of service required for the transaction and various other factors. In such an embodiment, the billing module 510 acts like a market maker to get the transaction completed at the lowest price.

The billing module 510 is coupled to the verification module 272 to determine the status of transactions. Once the transactions have been processed, the billing module 510 accumulates information regarding the requesting party and other information about the process. The billing module 510 then generates statements of credit or debit for the entity and the requesting parties, respectively.

In one embodiment, the billing module 510 accumulates information for a number of transactions and does not bill the requesting party until the entire series of transactions related to the application, module or document is complete. Such an embodiment requires coordination and communication between the billing module 510 and the verification module 272 so that the billing module 510 knows which transactions are related to the processing of which document, and when all the processing (transactions) for that document is complete.

In another embodiment, the billing module 510 also generates and processes retractions or credits. Such retractions or credits can be generated long after the requesting party has been billed such as in response to audits of logs, a customer compliant, an identified error or correction, or a discovery that the transaction was poorly, incompletely or inadequately performed. Those skilled in the art will appreciate that a variety of the conventional billing functions can be implemented by the billing module 510 including electronic billing, funds transfer, credit card processing, etc.

In another embodiment, the billing module 510 maintains a list or schedule of billing codes that represent transactions. Each of the billing codes can be used in association with the transaction step IDs 358 to identify the services to be provided and/or completed. In one embodiment, the billing codes have associated parameters for performing the service as well as pre-negotiated prices, and allocations of prices between the entities and the workflow server 106. Those skilled in the art will recognize that such billing codes may include additional information such as bulk discounts or special private pricing agreements. In yet another embodiment, the billing module 510 cooperates with the processor 291 and the communication unit 293 to allow updating and editing of the billing schedule consistent with market conditions and other private agreements.

The presentation module 522 is software and routines for displaying applications, documents and certificates in an online marketplace module 270 for purchase. The presentation module 522 generates a user interface for displaying the application, module and document as well as a ratings system, a classification system, a search bar for finding applications, etc.

Methods

Figure 6:
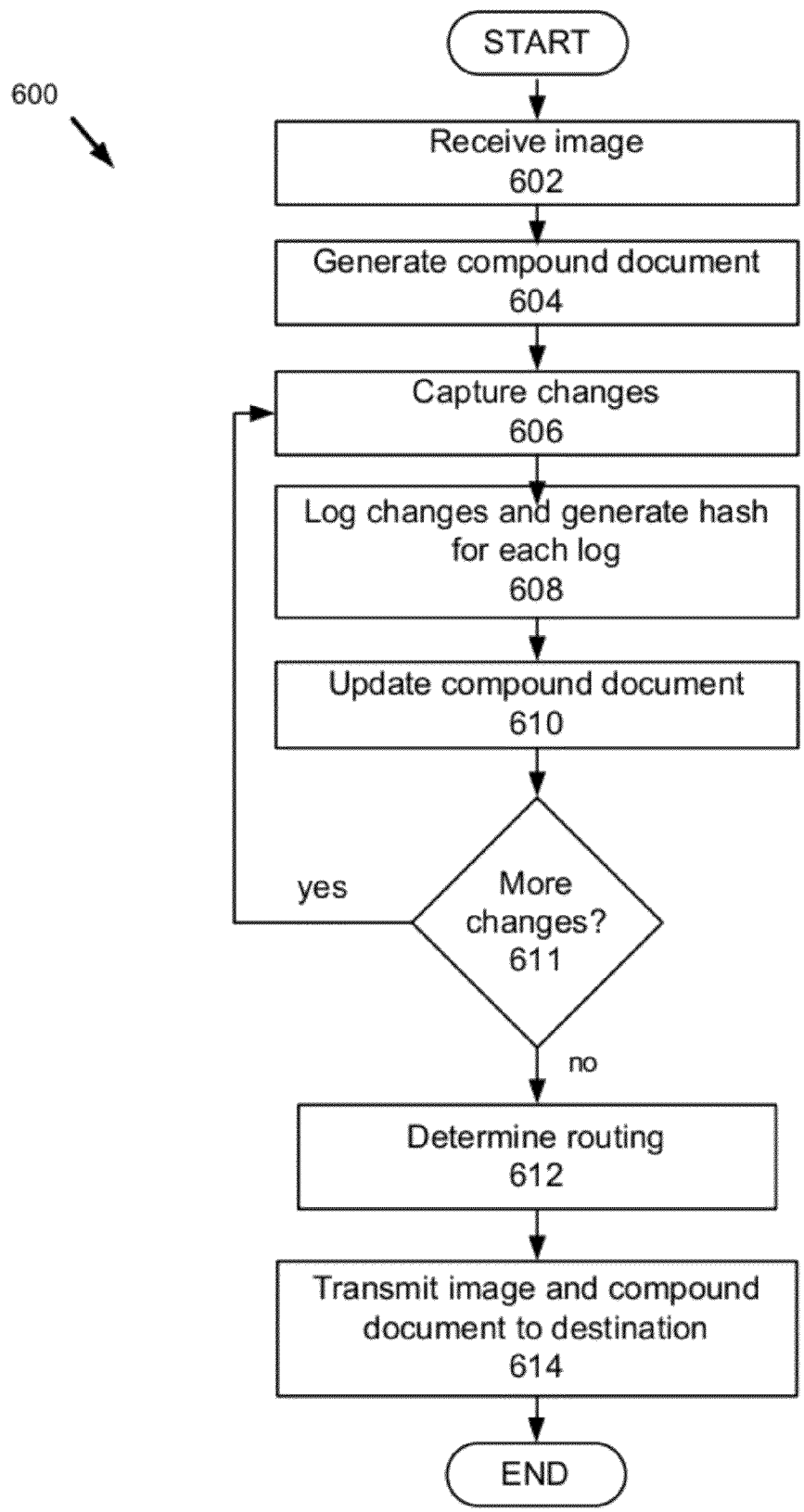
FIG. 6 is a flow diagram illustrating the generation of a log in accordance with the present embodiment of invention.
Figure 7A:
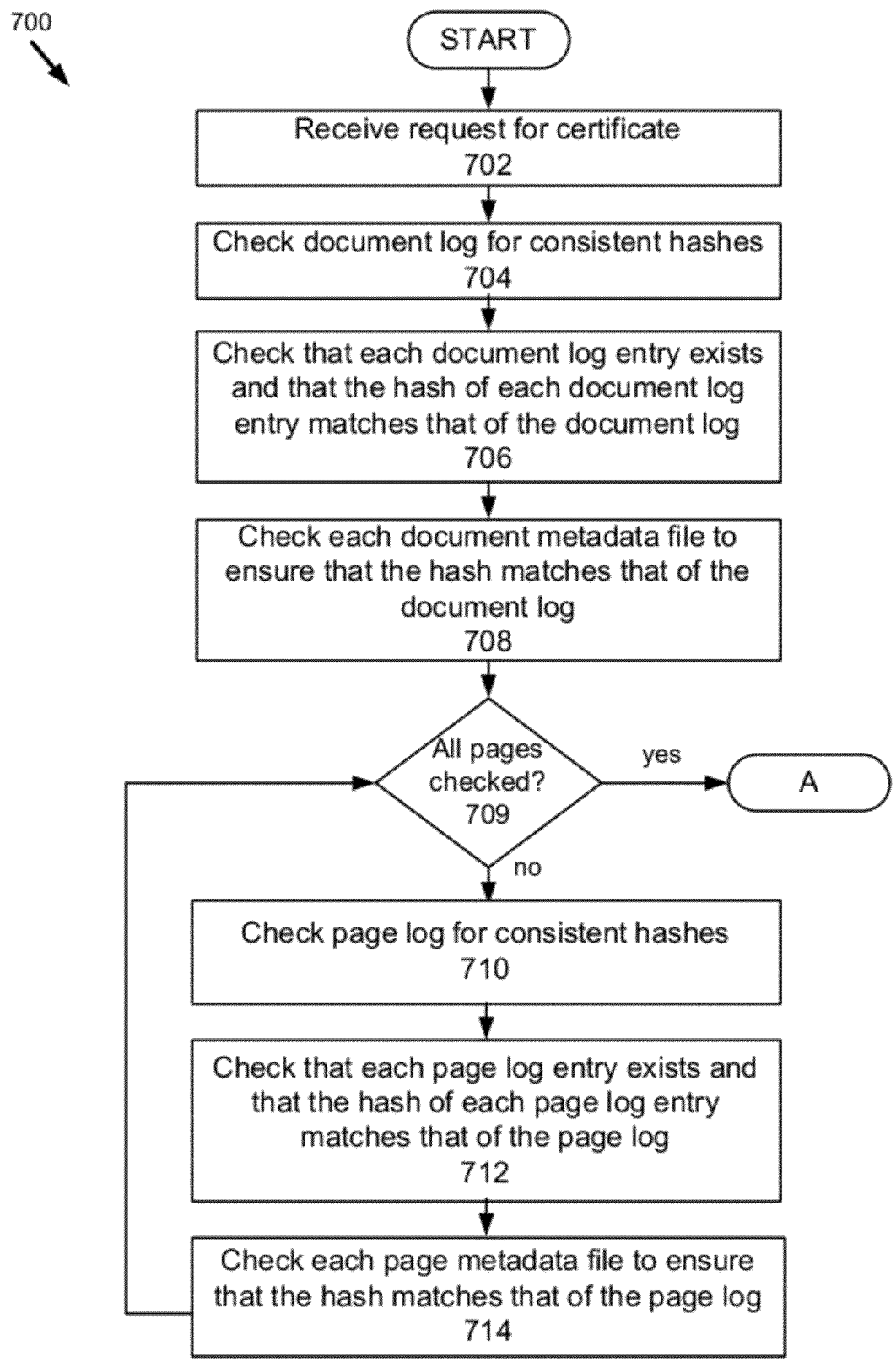
FIG. 7A-7B are flow diagrams illustrating the steps for verifying logs and generating a certificate in accordance with the present embodiment of invention.
Figure 7B:
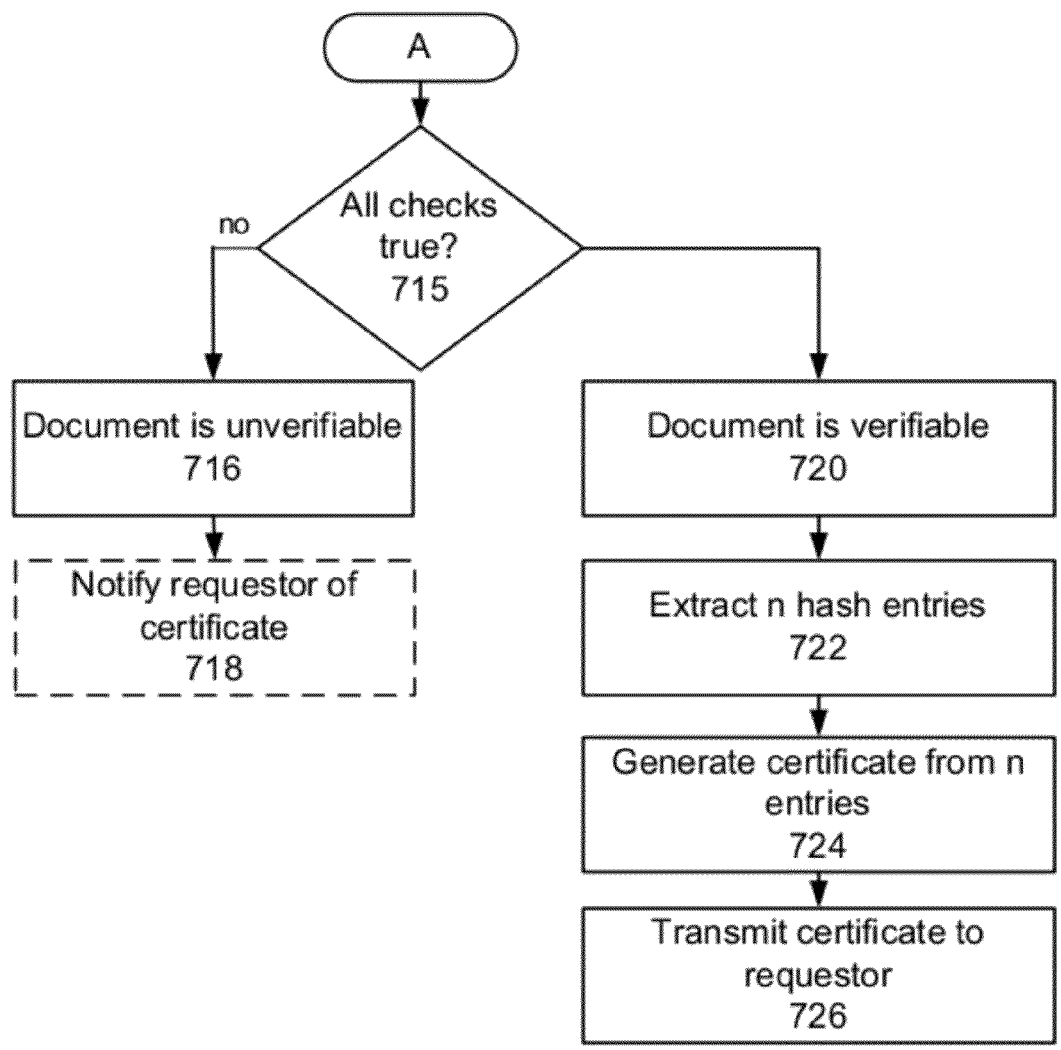
Figure 8:
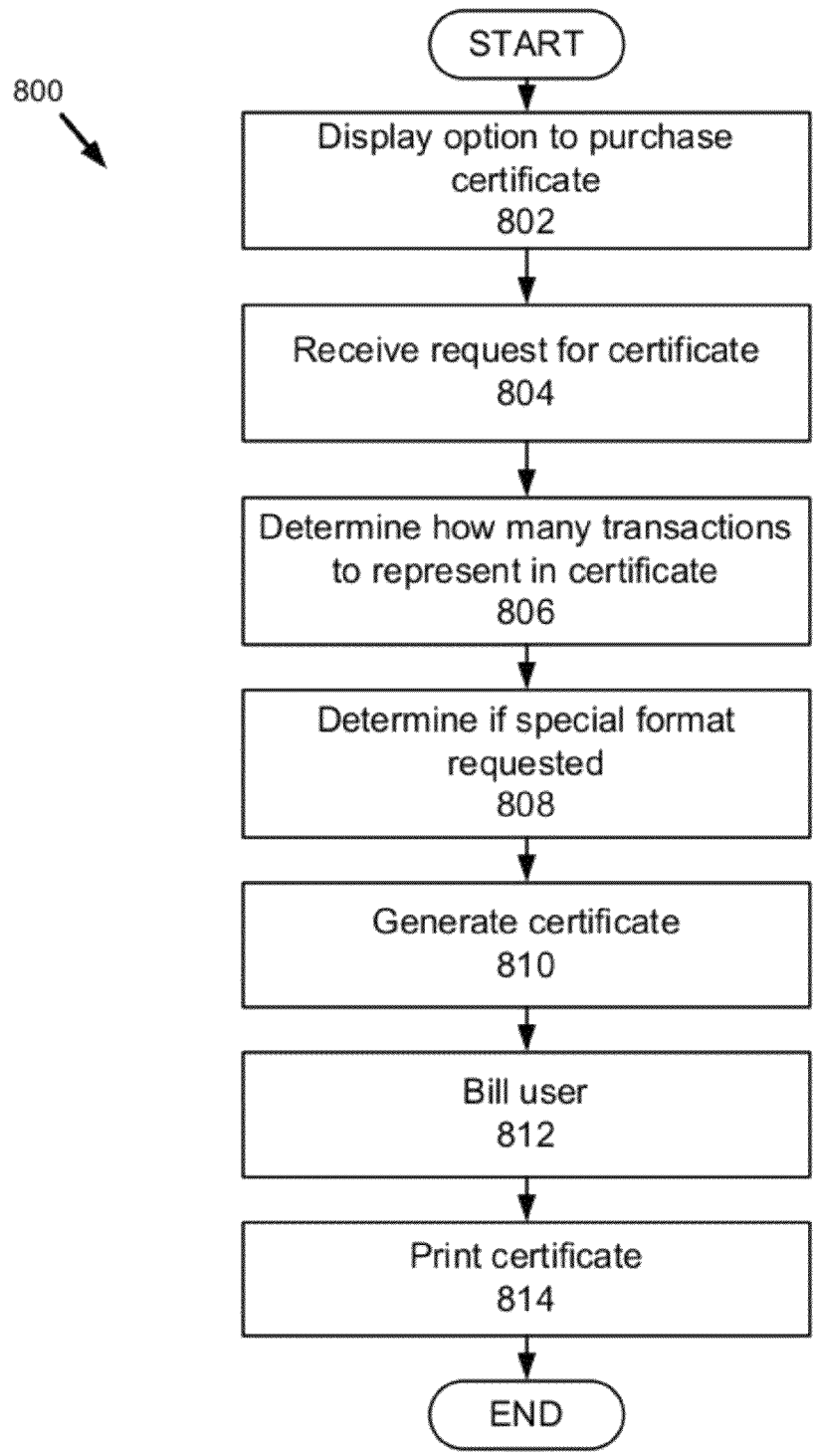
FIG. 8 is a flow diagram illustrating the billing for generation of a certificate for the log.

Referring now to FIGS. 6-8, the methods of the present embodiment of invention will be described in more detail. Referring now to FIG. 6, the method 600 will be described. In this embodiment, the steps are described as being performed by the portable computing device 102. Persons of ordinary skill in the art will recognize that the steps could also be performed by the workflow server 106.

The method 600 begins when the portable computing device 102 receives 602 an image or a group of images. These images are for a document, a form, etc. The logging module 214 generates 604 a compound document 400. The compound document 400 includes images and metadata as have been described above with reference to FIGS. 4B and 4C. The stroke and capture device and module 208 captures 606 changes made by a user on the display device 206 to a document. For example, the user inputs data with a stylus or finger into the portable computing device 102. The logging module 214 logs 608 the changes and updates 610 the compound document. For example, the logging module 214 updates 610 the page log 418 and the document log 408 after a pen-up gesture.

Next the method determines 611 whether additional changes are received by the portable computing device 102. This is determined by either a timeout or input from the user indicating that annotation of an image is complete. If there are more strokes to the input, the method returns to step 606 and repeats steps 606 through 610. If there are no additional strokes to be input the method continues by determining 612 the routing for the updated compound document 400 and transmitting 614 the image and compound document to its destination.

FIGS. 7A-B illustrate one embodiment of a method 700 for verifying logs and generating a printable certificate. In this embodiment, the steps are described as being performed by the workflow server 106. Persons of ordinary skill in the art will recognize that the steps could also be performed by the portable computing device 102.

The logging module 298 receives 702 a request for a certificate. The logging module 298 transmits a request to the verification module 272 to perform verification of the logs before the logging module 298 generates the certificate. The verification module 272 performs three types of verification: (1) confirms that the hashes are consistent; (2) checks the specific entries for authenticity; and (3) checks the metadata file for authenticity. The checking includes both the document log 408 and the individual page logs 418.

More specifically, the verification module 272 checks 704 the document log 408 for consistent hashes. Because each hash includes the hash from the previous transaction, a device ID and pointers to the entry in the log, the verification module 272 checks that the final rolling hash is accurate by computing the hashes for each transaction to verify that they are consistent and that no modifications were made. The verification module 272 then checks 706 that each document log entry exists and that the hash of each document log entry matches the document log 408. The verification module 272 checks 708 each document metadata file 406 to ensure that the hash matches that of the document log 408.

Once the document log 408 and document metadata 406 are verified, the verification module 272 determines 709 whether all pages have been checked. If not, the verification module 272 checks 710 the page log 418 for consistent hashes. The verification module 272 then checks 712 that each page log entry exists and that the hash of each page log entry matches that of the page log 418. Lastly, the verification module 272 checks 714 each page metadata file 404 to ensure that the hash matches that of the page log 418.

If all pages are checked, the verification module 272 determines 715 whether all checks are true. If not, the verification module 272 determines 716 that the document is unverifiable. In one embodiment, the verification module 272 notifies 718 the requestor of the certificate that the document is unverifiable.

If all checks are true, the verification module 272 determines 720 that the document is verifiable and notifies the logging module 298 that the certificate can be generated. The logging module 298 extracts 722 n hash entries based on the request and generates 724 a certificate from n entries. In one embodiment the logging module 298 generates a three dimensional bar code to represent each hash. The transfer module 274 transmits 726 the certificate to the requestor.

The certificate is useful for proving the authenticity of a document. Because each hash includes a hash from the previous transaction, the chain of hashes are each independently verifiable. The certificate is presented to a customer or an entity that wants verification of authenticity. In another embodiment, the certificate is also used to prove who modified the document. For example, the certificate is presented during a lawsuit to prove that a document has been verified. The certificate could be extra helpful in a case where two parties to the lawsuit modified the same document and each party verified the document because it further proves that there should be agreement about the authenticity of the document.

In one embodiment, the certificate includes a hash for each transaction and a time that the hash occurred. The device ID for a user associated with a company is included in the hash and can be identified from the hash. In another embodiment, the certificate also includes a separate column for a device ID for the device that performed the transaction. FIG. 8 illustrates one embodiment of a method 800 for charging a user for a certificate. The online marketplace module 270 displays 802 an option to purchase a certificate for a document on the online marketplace. The purchasing comes with several options including a certificate for the last transaction, a certificate for a specified transaction (e.g. a transaction in the middle of the history of the document), a certificate for a certain number of transactions, such as the last five transactions and a certificate that includes hashes for all the transactions that have ever occurred. A user can also purchase a certificate that generates a certificate in a specific format including typical formats such as jpeg and PDF but also certain formats that are accepted in legal proceedings.

The online marketplace module 270 receives 804 a request for the certificate and determines 806 how many transactions to represent in the certificate based on what the user specified during purchasing. The online marketplace module 270 also determines 808 if a special format was requested during purchasing. In one embodiment, the default format for the certificate is a PDF. The online marketplace module 270 requests that the logging module 298 transmit the certificate and provides the logging module 298 with the identifying information for the document. The logging module 298 generates 810 the certificate and transmits the certificate to the user. The generating step includes the internal verification process described in FIGS. 7A-B. The online marketplace module 270 bills 812 the user for the document. The user prints 814 the certificate.

The foregoing description of the embodiments of the present embodiment of invention has been presented for the purposes of illustration and description. It is not intended to be exhaustive or to limit the present embodiment of invention to the precise document disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific documents without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or documents. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the disclosure of the present embodiment of invention is intended to be illustrative, but not limiting, of the scope of the present embodiment of invention, which is set forth in the following claims.

The invention claimed is:

1. A computer-implemented method comprising:
receiving, with one or more processors, an image;
generating, with the one or more processors, a compound document of the image, the compound document including a document log and a page log;
capturing, with the one or more processors, a change made to the image, the change comprising an annotation of the image;
logging, with the one or more processors, the change made to the image;
generating, with the one or more processors, a hash for the change made to the image, the hash including a previous hash of a previous transaction performed on the image and a unique identifier for a device that generated the hash for the change made to the image;
updating, with the one or more processors, the document log and the page log of the compound document with the hash for the change made to the image;
receiving, with the one or more processors, a request for a certificate, the certificate including the hash for the change made to the image;
extracting, with the one or more processors, the hash for the change made to the image from the compound document; and
generating, with the one or more processors, the certificate from the hash for the change made to the image.

2. The method of claim 1, wherein the certificate includes a time of the change.

3. The method of claim 1, wherein the certificate identifies a device that made the change.

4. The method of claim 1, further comprising:
determining a number of transactions performed on the image;
generating transaction hashes for each transaction;
wherein the request specifies the number of transactions; and
wherein the certificate is also generated from the transaction hashes.

5. The method of claim 4, further comprising billing a user based on the number of transactions specified in the request.

6. The method of claim 1, wherein before the certificate is generated, the method further comprises:
determining whether transaction hashes in the document log of the compound document are consistent by computing a transaction hash for each transaction in the document log and verifying that a final rolling hash computed based on the transaction hash for each transaction is accurate;
determining whether each entry in the document log exists and that a transaction hash computed for each entry matches the transaction hash computed for each transaction in the document log;
determining whether the transaction hash computed for each transaction in the document log matches each document metadata file; and
determining that the compound document is verified.

7. The method of claim 1, wherein the hash includes a raster format of the image.

8. The method of claim 1, further comprising printing the certificate.

9. A system comprising:
one or more processors; and
a memory, the memory storing instructions, which when executed by the one or more processors, cause the one or more processors to perform the operations of:
receiving an image;
capturing a change made to the image, the change comprising an annotation of the image;
generating
a compound document of the image, the compound document
including a document log and a page log;
logging the change made to the image;
generating a hash for the change made to the image, the hash including a previous hash of a previous transaction performed on the image and a unique identifier for a device that generated the hash for the change made to the image;
updating the document log and the page log of the compound document with the hash for the change made to the image;
receiving a request for a certificate, the certificate including the hash for the change made to the image;
extracting the hash for the change made to the image from the compound document; and
generating the certificate from the hash for the change made to the image.

10. The system of claim 9, wherein the certificate includes a time of the change.

11. The system of claim 9, wherein the certificate identifies a device that made the change.

12. The system of claim 9, the operations comprising determining a number of transactions performed on the image and generating transaction hashes for each transaction, wherein the request specifies the number of transactions and wherein the certificate is also generated from the transaction hashes.

13. The system of claim 12, the operations comprising billing a user based on the number of transactions specified in the request.

14. The system of claim 9, the operations comprising displaying the certificate for purchase.

15. The system of claim 9, the operations comprising determining, before the certificate is generated, whether transaction hashes in the document log of the compound document are consistent by computing a transaction hash for each transaction in the document log and verifying that a final rolling hash computed based on the transaction hash for each transaction is accurate, determining whether each entry in the document log exists and that a transaction hash computed for each entry matches the transaction hash computed for each transaction in the document log, determining whether the transaction hash computed for each transaction in the document log matches each document metadata file and determining that the compound document is verified.

16. The system of claim 9, wherein the hash includes a raster format of the image.

17. The system of claim 9, wherein the certificate is generated as a PDF.

18. A computer program product comprising a computer readable non-transitory storage medium including a computer readable program, wherein the computer readable program when executed on a computer causes the computer to:

receive an image;

generate a compound document of the image, the compound document including a document log and a page log;

capture a change made to the image, the change comprising an annotation of the image;

log the change made to the image;

generate a hash for the change made to the image, the hash including a previous hash of a previous transaction performed on the image and a unique identifier for a device that generated the hash for the change made to the image;

update the document log and the page log of the compound document with the hash for the change made to the image;

receive a request for a certificate, the certificate including the hash for the change made to the image;

extract the hash for the change made to the image from the compound document; and generate the certificate from the hash for the change made to the image.

* * * * *

UNITED STATES PATENT AND TRADEMARK OFFICE
CERTIFICATE OF CORRECTION

PATENT NO. : 9,026,474 B2  
APPLICATION NO. : 13/042298  
DATED : May 5, 2015  
INVENTOR(S) : Kurt W. Piersol Page 1 of 1

It is certified that error appears in the above-identified patent and that said Letters Patent is hereby corrected as shown below:

Title page

Item (73) Assignee: replace "Google Inc." with "Ricoh Co., Ltd."

Signed and Sealed this
Twenty-fourth Day of May, 2016

Michelle K. Lee
*Director of the United States Patent and Trademark Office*